(12) United States Patent
Czerner

(10) Patent No.: US 9,040,870 B2
(45) Date of Patent: May 26, 2015

(54) DEVICE FOR RE-CONTOURING A GAS TURBINE BLADE

(71) Applicant: Lufthansa Technik AG, Hamburg (DE)

(72) Inventor: Stefan Czerner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 343 days.

(21) Appl. No.: 13/723,222

(22) Filed: Dec. 21, 2012

(65) Prior Publication Data

US 2013/0161297 A1 Jun. 27, 2013

(30) Foreign Application Priority Data

Dec. 22, 2011 (DE) .................. 10 2011 089 699

(51) Int. Cl.
| | | |
|---|---|---|
| F01D 5/00 | (2006.01) | |
| B23K 26/34 | (2014.01) | |
| B23K 37/04 | (2006.01) | |
| B23P 6/00 | (2006.01) | |
| B23Q 1/25 | (2006.01) | |
| B23C 3/00 | (2006.01) | |
| B23K 26/00 | (2014.01) | |
| B24B 19/14 | (2006.01) | |
| B23Q 9/00 | (2006.01) | |

(52) U.S. Cl.
CPC ............. *B23K 26/0066* (2013.01); *B23K 26/34* (2013.01); *B23P 6/00* (2013.01); *B23P 6/007* (2013.01); *B23K 37/04* (2013.01); *F01D 5/00* (2013.01); *B23Q 1/25* (2013.01); *B23C 3/00* (2013.01); *B24B 19/14* (2013.01); *B23K 26/0081* (2013.01); *B23Q 9/0014* (2013.01); *F01D 5/005* (2013.01); *B23K 2201/001* (2013.01); *F05D 2230/80* (2013.01); *Y02T 50/671* (2013.01); *Y02T 50/673* (2013.01)

(58) Field of Classification Search
CPC ........... B23K 26/0066; B23K 26/0081; B23K 26/34; B23K 37/04; B23P 6/00; B23P 6/007; B23Q 1/25; B23C 3/00; F01D 5/00
USPC ............... 219/121.6, 121.65, 121.66, 121.82; 269/303, 305; 29/402.01, 402.18, 29/888.021, 889.1; 228/119, 196, 212, 228/47.1
See application file for complete search history.

(56) References Cited

U.S. PATENT DOCUMENTS

| | | | | |
|---|---|---|---|---|
| 4,638,602 | A | * | 1/1987 | Cavalieri ..................... 451/365 |
| 5,281,062 | A | | 1/1994 | Dunkman et al. |

(Continued)

FOREIGN PATENT DOCUMENTS

| | | |
|---|---|---|
| DE | 69124224 T2 | 8/1997 |
| DE | 102009004661 A1 | 7/2010 |

(Continued)

*Primary Examiner* — Samuel M Heinrich
(74) *Attorney, Agent, or Firm* — Leydig, Voit & Mayer, Ltd.

(57) ABSTRACT

A device for recontouring a gas turbine blade includes at least one support configured to rest on an edge of the gas turbine blade during the recontouring, at least one side bearing configured to rest on an intake side or an outlet side of the gas turbine blade during the recontouring and a machining unit for machining the gas turbine blade. The machining unit is configured to fuse at least one partial area of the edge of the gas turbine blade using a beam of energy that is targeted such that material of the blade solidifies into a new contour, substantially without the addition of supplementary material.

14 Claims, 5 Drawing Sheets

(56) References Cited

U.S. PATENT DOCUMENTS

| | | | | |
|---|---|---|---|---|
| 5,847,350 A | * | 12/1998 | Dorrel et al. | ............... 219/69.15 |
| 6,302,625 B1 | | 10/2001 | Carey et al. | |
| 8,247,733 B2 | | 8/2012 | Zhu | |
| 2003/0066820 A1 | * | 4/2003 | Byrnes et al. | .............. 219/69.11 |
| 2012/0047735 A1 | | 3/2012 | Czerner | |

FOREIGN PATENT DOCUMENTS

| | | |
|---|---|---|
| DE | 102010036042 B3 | 2/2012 |
| EP | 2130638 A1 | 12/2009 |
| EP | 2161095 A1 | 3/2010 |
| JP | 4289154 A | 10/1992 |

\* cited by examiner

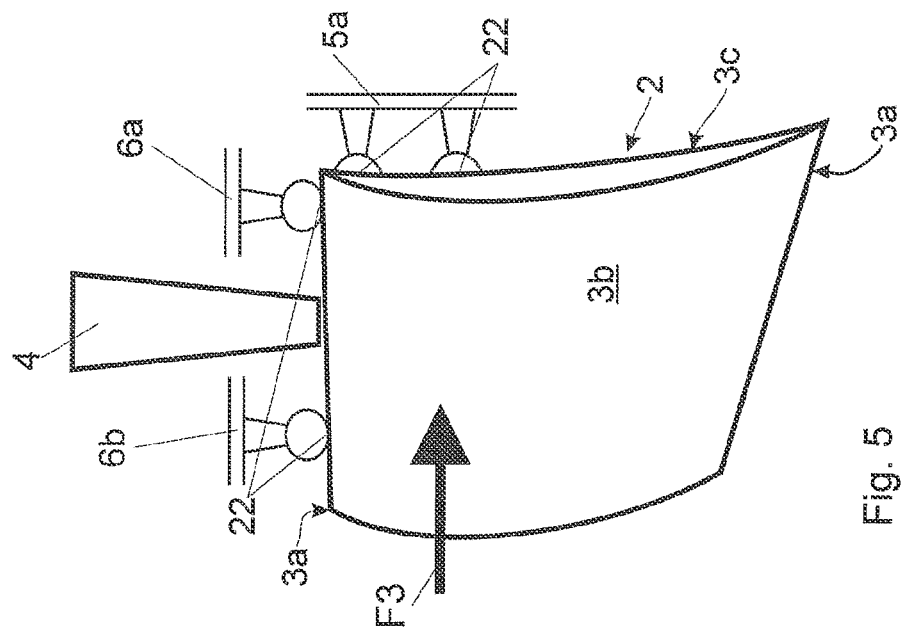
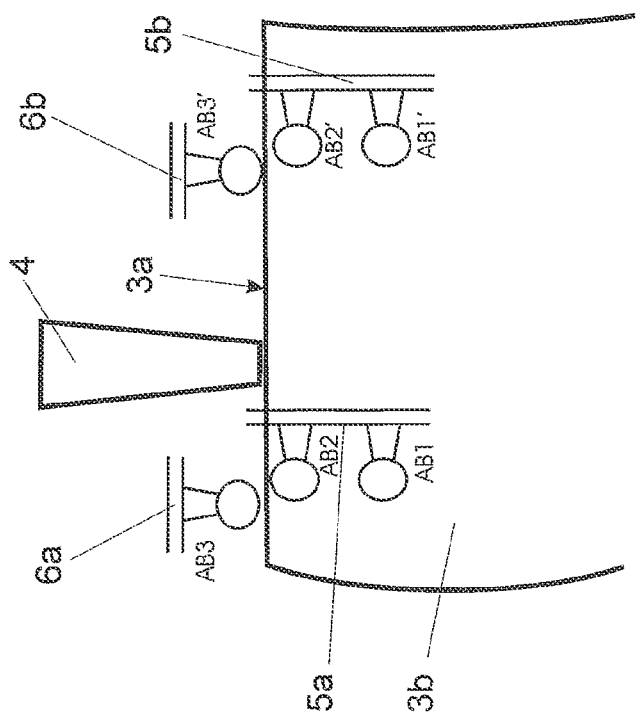
Fig. 5
Fig. 4

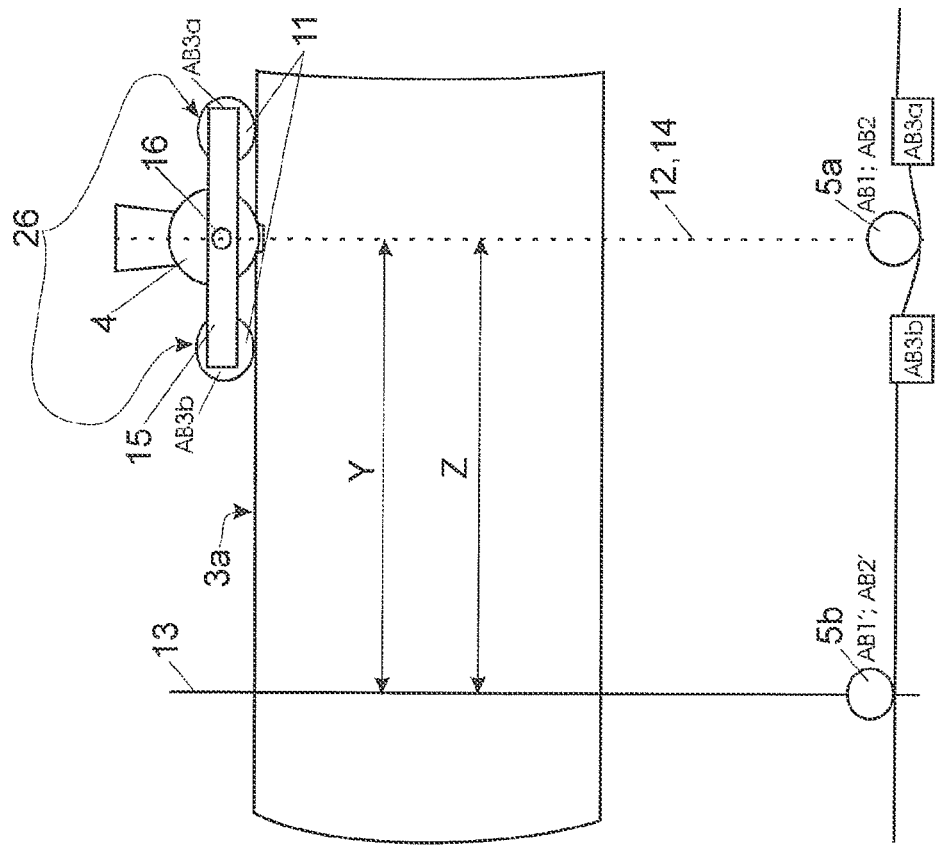
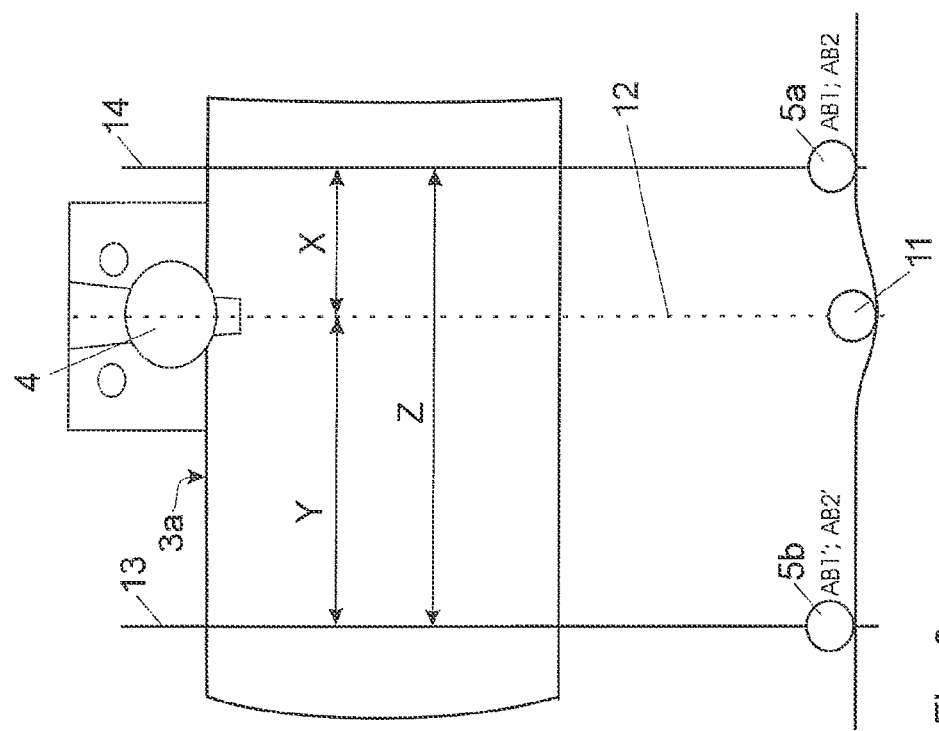

DEVICE FOR RE-CONTOURING A GAS TURBINE BLADE

CROSS REFERENCE TO RELATED APPLICATIONS

This application claims priority to German Patent Application No. DE 10 2011 089 699.6, filed Dec. 22, 2011, which is hereby incorporated by reference herein in its entirety.

FIELD

The invention concerns a device for re-contouring a gas turbine blade.

BACKGROUND

In operation, the blades in gas turbines, particularly in aircraft engines, are subject to wear caused by erosive particles, for example sand or dust.

In the forward section of the gas turbine, the compressor section, erosion generally brings about a flattening of the leading edge of the compressor blades. Here, the compressor blades of the first compressor step, the so-called "fan blades", are many times larger than other blades of the propulsion unit. In the unworn state, the compressor blades have an aerodynamically optimized profile, which is adversely altered due to the wear.

As a consequence of this type of deterioration of the aerodynamic profile, the gas turbine becomes less efficient, that is, the gas turbine requires more fuel for the same performance.

From an economic point of view, therefore, counteracting the wear of compressor blades, particularly a deterioration of aerodynamically optimized blade geometries, is worthwhile.

For this purpose, repair processes have been established which are geared towards providing damaged compressor blades with as aerodynamically optimal as possible geometries again.

A device is known from U.S. Pat. No. 6,302,625 B1, with which the blade-edge can be reconstructed. During the reconstruction process, this device is directed towards the blade in a predetermined direction by means of various positioners. The positioners form a type of positive guide towards the blade for the device, such that the device can be easily managed by touching down on the blade edge and moving along the blade edge.

The positioners are arranged on a lateral surface of a conically tapered slot, with which the device is placed onto one of the edges of the blade. When the device is suspended on the blade edge, the positioners arrive at one of the blade surfaces laterally to the attachment. The placement depth of the device on the blade edge is limited by the conicity and the depth of the slot of the device. The actual section which changes the shape of the blade is arranged in the base of the slot.

Hence, the conical slot forms a guide for the device, whereby the depth to which the device is placed on the blade is dependent on the individual management of the device. Since the recontouring of the blade takes place by means of processing the surface, it is also necessary to have a certain minimum clearance between the blade edge and the base of the slot in order to form a cavity in which excess material can be collected. Owing to this minimum clearance, the device cannot be guided with positional accuracy in relation to the depth to which the blade edge projects into the slot.

Moreover, some gas turbine blades, for example new types of fan blade, are furnished with geometrically complex edge geometries which complicate the precise machining of the blade edges using common devices.

For example, for certain fan blades, the blades in the upper section work in the supersonic range during operation and the lower blades work in the subsonic range. For this reason, the contour of the blade is changed, both in pitch angle and in cross section, and presents a complex geometric edge geometry which can only be precisely machined with difficulty.

Furthermore, the base material of the gas turbine blade is always worn away due to the cutting machining used routinely and hence the chord length of the blade is shortened by the recontouring process.

SUMMARY

An aspect of the invention is to create a device for recontouring a gas turbine blade, with which the above-mentioned problems can be reduced or avoided.

In an embodiment, the present invention provides, a device for recontouring a gas turbine blade including at least one support configured to rest on an edge of the gas turbine blade during the recontouring, at least one side bearing configured to rest on an intake side or an outlet side of the gas turbine blade during the recontouring and a machining unit for machining the gas turbine blade. The machining unit is configured to fuse at least one partial area of the edge of the gas turbine blade using a beam of energy that is targeted such that material of the blade solidifies into a new contour, substantially without the addition of supplementary material.

BRIEF DESCRIPTION OF THE DRAWINGS

Exemplary embodiments of the present invention are described in more detail below with reference to the drawings, in which:

FIG. 4 shows a representation of the preferred three-point bearing of the device;
FIG. 5 shows a representation of the forces operating on the blade;
FIG. 6 shows a composite side and plan view of the device positioned on a blade edge;
FIG. 7 shows a composite side and plan view of a further embodiment of the device.

DETAILED DESCRIPTION

Figure 1:
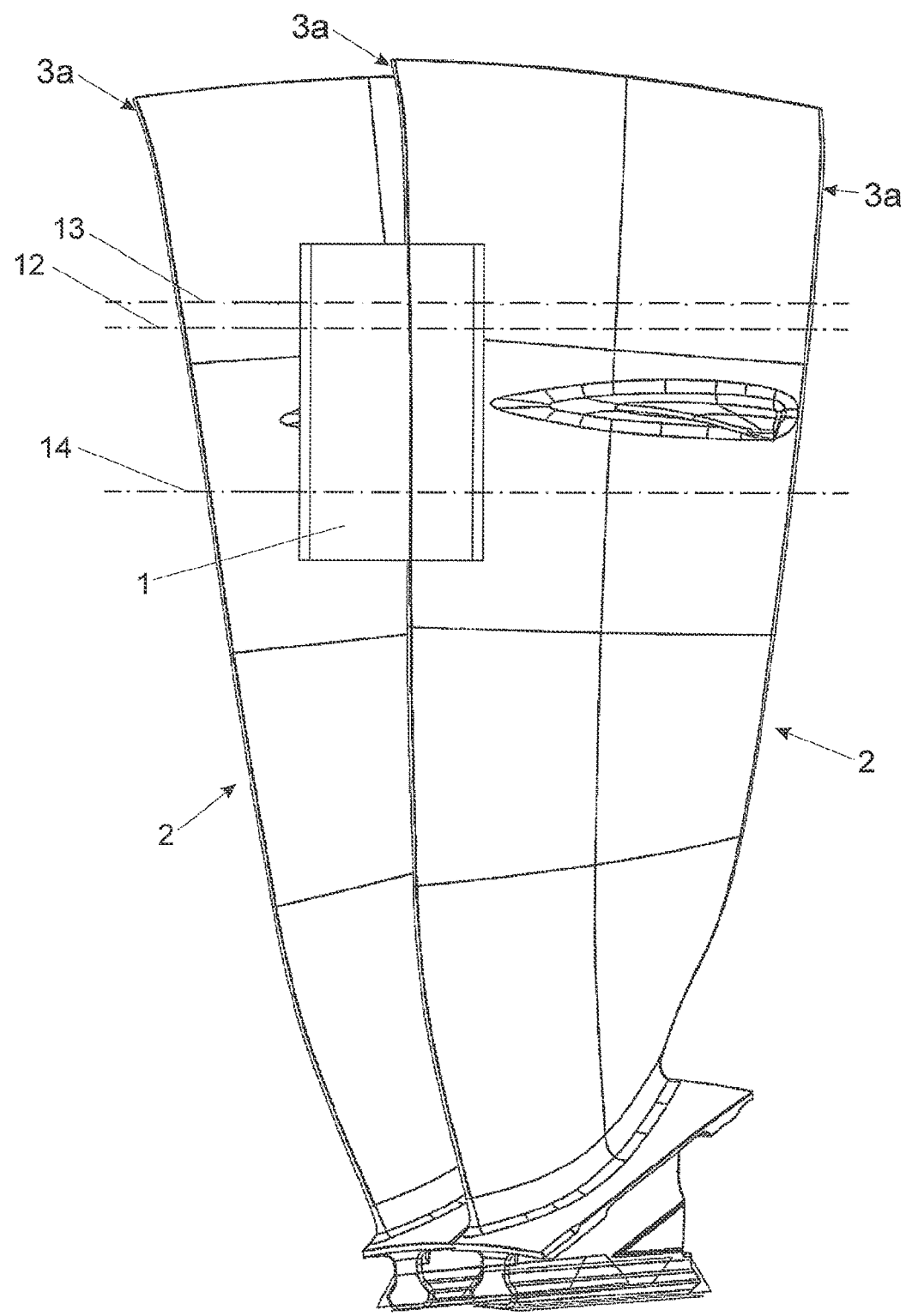
FIG. 1 shows a device for recontouring an edge of a blade.

In an embodiment, the present invention provides a device for recontouring a gas turbine blade is proposed, with:
at least one support, arranged to rest on one edge of the gas turbine blade during the recontouring,
at least one side bearing, arranged to rest on the intake side and/or the outlet side of the gas turbine blade in a lateral direction during the recontouring,
a machining unit, for performing the machining of the gas turbine blade, whereby
the machining unit is constituted to fuse at least a part of the area of the edge in a targeted fashion using a beam of energy in such a way that the material solidifies into a new contour, substantially without the addition of supplementary material.

The particular advantage of the proposed guide can be seen in that the machining unit is advantageously guided along the edge to be machined, such that the machining unit arranged on the device is guided with a consistent machining clearance to the edge or in a consistent direction towards the edge. Hence, the device is able to follow the course of the edge. This is particularly advantageous since the clearance and the direction of the proposed machining unit in relation to the edge are particularly important for the quality of the recontouring, as is the case e.g. when fusing the edge.

Moreover, the device can also be used on geometrically very complex blade edge geometries, in particular also on various different types of gas turbine blades.

Here, the quality of the recontouring is improved by the machining unit being constituted to fuse at least a part of the area of the edge in a targeted fashion using a beam of energy in such a way that the material solidifies into a new contour, substantially without the addition of supplementary material. Here, the beam of energy is preferably realized as a laser beam, which is well suited for the recontouring according to the invention.

A device, which is constituted for this kind of machining of the blade edge using a beam of energy substantially without the addition of supplementary material, is markedly different from the known devices. One particular advantage of the device is that there is no material loss due to the machining process in the recontouring (e.g. grinding processes). Consequently, there is also no change (or an extremely minimal change) in the moment weight due to the recontouring and, consequently, no measurable change (or an extremely slight change) in the run-out due to the inertia of the gas turbine blades when fitted.

Moreover, this type of device has the advantage that the chord length of the gas turbine blades is not shortened further due to the machining, but, as described above, this can even be partly reconstructed. As a result, a considerably longer gas turbine blade can be utilized, which reduces maintenance costs for the engine significantly.

Primarily, due to machining using the device, the material solidifies into a given contour, substantially without the addition of supplementary material. Here, given means that the fusing of the material and the associated change in the geometry are not random, but the device allows a new part to be designed resembling the original contour or a geometry to be created, which is advantageous, for example, in terms of its aerodynamic characteristics.

As a consequence, a "new contour" describes a profile that is largely oriented towards the condition of the new part on delivery.

Advantageously, very small amounts of additives can be introduced into the area fused using the beam of energy. In fact, the machining is characterized in that the addition of supplementary material can be substantially dispensed with; very small amounts (less than 50% of the fused volume), however, can be introduced into the fusing zone, for example in order to realize a particularly hard, erosion-resistant or otherwise beneficial leading edge. Unlike the known process, these additives serve less to reconstitute the eroded volume of the leading edge (as is the case, for example, with build-up welding) than to modify the material characteristics of the leading edge beneficially.

Along with recontouring substantially without the addition of supplementary material, the device can also be constituted in an advantageous embodiment, in order to recontour the blade edge using a build-up welding process with the addition of supplementary material.

The machining unit can also preferably include elements, for example, mirrors, by which the laser beam can be oscillated back and forth in a lateral direction, in order always to keep the laser beam directed towards the edge.

The device preferably includes a laser unit for generating the laser beam, whereby the laser beam is preferably directed from a generator to the machining unit via optical fiber. It leaves the optical fiber and emerges at the edge. Thus, the optical fiber is preferably directed towards the edge. In the process, the emergence on the edge is also termed "coupling in". By coupling the laser in, energy is introduced into the edge, which is used to fuse or recontour the edge.

In addition, the entire device is preferably portable. The device preferably incorporates a convenient attachment in which the machining unit is arranged and which is guided along the edge by the supports and side bearings, together with a laser unit connected to the convenient attachment, in which a laser is generated and then transferred to the machining unit. Overall, the device is dimensioned such that it is suitable for mobile usage at different sites.

Hence, multiple blades can be recontoured "on wing", whereby the maintenance time during which the gas turbine is not operational can be considerably reduced. For on wing machining, the blades are recontoured while they are fitted in an engine suspended from the wing of an airplane. Thanks to the mobile device, these can be transported from operating site to operating site more easily in order to enable on wing recontouring of the blades onsite.

Cutting machining can be performed alternately or in addition to the non-cutting machining described above. Advantageously, the machining unit also includes devices for cutting machining. At the same time, the machining unit can also, for example, be convertible and the device can be utilized for cutting machining or non-cutting machining by selecting the machining unit.

Similar to non-cutting machining, the component can be improved in terms of its aerodynamic characteristics using a cutting device or machining unit. The cut contour produced in the process is aerodynamically more advantageous than the erosion contour produced by the wear.

As a rule, the new contour described above, obtained by non-cutting machining, gives the blade even more improved aerodynamic characteristics than those obtained using a cutting machining.

The guidance of the device can be improved by a further range of characteristics.

Preferably, the device features, for example, at least two supports and at least two side bearings. Hence, the stability and safe handling of the device can be increased.

Preferably, the machining unit is arranged between the supports. Arranging the machining unit between the supports has a positive effect on the machining precision since the device is thus better protected from tipping over in the direction of the machining.

Preferably, the side bearings each feature at least two locating points and/or locating faces. Depending on whether the side bearing, for example, incorporates rotary elements, the side bearings may be in contact with the blade via surfaces or points. The side bearings guide the device, such that the machining element can always be introduced precisely.

Preferably, this guidance can be improved by placing the locating points and/or locating faces of at least one side bearing on a contact level with the support point or the support face of a support. This contact level preferably runs perpendicular to the machining direction, as is described in detail at a later point by reference to FIGS. 2 to 5. The advantage of this type of arrangement can be seen in that it enables more precise device guidance in comparison with the known devices.

Safe handling can be further improved if another second contact level is provided for which the locating points of the side bearings and supports are located on one level which, in turn, preferably runs perpendicularly to the direction of the machining. Hence, it is preferred when the locating points and/or locating faces of at least one further side bearing are located on a contact level with the support point or the support face of a further support.

In order to avoid grinding marks and/or scratches on the gas turbine blade, preferably one or more of the supports and/or side bearings is formed by hinge-mounted rollers.

To improve the positioning of the device on the gas turbine blade, preferably one or more press-on assemblies are mounted on the intake and/or the outlet side of the gas turbine blade, facing the side bearings. Preferably, at least one press-on assembly is provided. The force is preferably applied by movable rollers or belts, which generate the pressing force, independently of the diameter of the gas turbine blade, via pneumatic thrust plates and/or spring elements. Consequently, the press-on assembly or assemblies preferably include pneumatic, hydraulic and/or spring elements.

Thanks to the press-on assembly, the device can effectively immobilize itself on the blade, exerting a clamping force, such that the device, even under the restoring force via the machining unit during the machining process, will not detach from the blade or move unintentionally relative to the blade.

Preferably, the press-on assembly incorporates hinge-mounted rollers. Overall, an essentially more even motional process can be realized by the use of rollers, whereby, particularly for a continuous recontouring of the edge, very low and even feed rates are made possible.

In this case, it is advantageous if at least one roller can be driven by a driving device. The device can be guided along the edge of the blade by the driving device, whereby the control is particularly even and small feed motions are made possible.

In addition, it is proposed that the driving device and the machining unit should be controlled as coupled. If the machining unit recontours the edge e.g. by fusion, build-up welding or even cutting machining, the feed rate of the device has at least an indirect influence on the contouring accuracy of the recontoured edge, such that this correlation can be taken into account by coupled controlling of the driving device and the machining unit. Thus, e.g. the machining unit can be automatically deactivated on reaching the end position of the device or where there is a standstill of the device, or the intensity of the machining can be increased for a rapid performance. Accordingly, for a slower performance, the intensity can be reduced.

In addition, it is proposed that the rollers are coated with an elastomer. Due to the proposed coating of the rollers, these are at least slightly elastic on the surface, such that minor imperfections on the surface of the blade can be compensated for and, moreover, elastic clamping forces can be more easily exerted on the blade, without the device having to be intrinsically particularly elastic in design.

In a further preferred embodiment, at least one of the supports includes two rollers, which are connected to each other via a hinge-mounted shaft and whereby the machining is performed between the two rollers. In this fashion, it is made possible for the machining plane to correspond with a contact level. This advantageous realization will be explained at a later point by reference to FIG. 5.

Preferably, the machining unit can be relocated in a direction perpendicular to the direction of the machining.

At the same time, the characteristic perpendicular to the direction of the machining includes all directions running transversely to the direction of the machining. Here, two directions are preferred. On the one hand, the lateral direction in which the side bearings on the gas turbine blade are also positioned, and the vertical direction, which is perpendicular to both the direction of the machining and the lateral direction. Thus, the machining unit is preferably movable in the lateral direction and/or in the vertical direction.

The ability to be displaced perpendicular to the direction of the machining enables the machining unit to follow the course of the edge particularly well, both lateral irregularities and deviations in the vertical direction. These may be, for example, dents or rounding-off already carried out. This type of irregularity, as is described in detail at a later point, can have an adverse effect on the quality of the recontouring.

In FIG. 1, a device 1 in accordance with the invention can be seen on a blade 2, which is part of a blade ring of a compressor stage or of a stator blade ring of a gas turbine, in particular, of an airplane engine. The overall dimensions of the device 1 are such that it can be fed into a flow channel to an adjacent blade 2, without having to dismantle blades 2 for this. Hence, the blade 2 can be recontoured "on wing", whereby the maintenance time during which the gas turbine is not operational can be considerably reduced. For on wing machining, the blade 2 is recontoured while it is fitted in an engine suspended from the wing of an airplane. Thus, the blade 2 does not have to be remove from the propulsion unit for machining.

The blades 2 each have two edges 3a, a flow leading edge and a flow trailing edge. Using the device 1, both the flow leading edge and the flow trailing edge can be machined and recontoured.

In FIG. 1, the machining plane 12 and the two guidance or contact levels 13 and 14, described in detail later on, are also illustrated.

Figure 2:
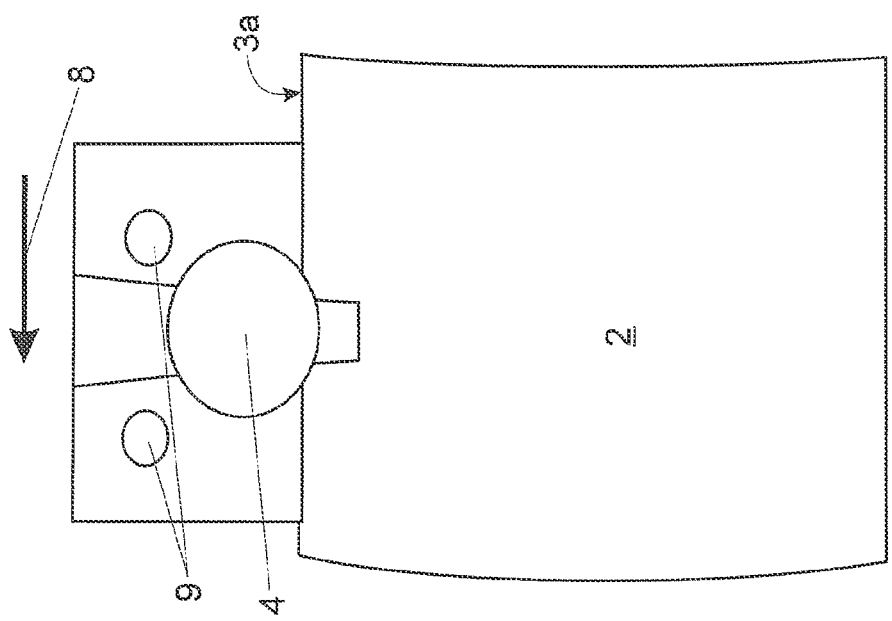
FIG. 2 shows a side view of the machining unit positioned on a blade edge.

In FIG. 2, a side view of the machining unit 4 is shown; this is a part of the device 1 and is positioned on a blade edge 3a. The machining unit 4, together with the device 1, is guided along a direction of the machining 8, along the edge 3a. In this illustration, the housing of the device 1 and other parts of the device have been omitted for the sake of the overview.

During the machining movement, the edge 3a is recontoured by the machining unit 4, and this example of the realization concerns the flow leading edge of the blade 2.

The machining unit 4 can be moved in the direction of the image plane via the displacement axes 9. This displacement axis mechanism is shown again in FIG. 2.

Figure 3:
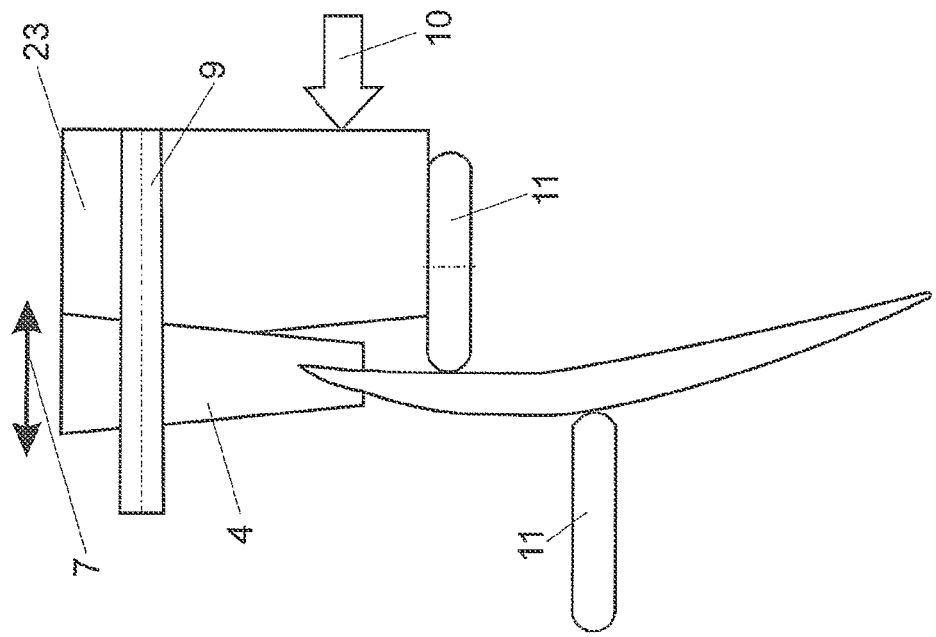
FIG. 3 shows a section view of the machining unit positioned on a gas turbine blade with a roller to compensate for dents in the gas turbine blade.

In FIG. 3, a section view through the machining unit 4 is shown, which is shown positioned on a blade 2, also shown in section. The blade 2 features a naturally convex intake side 3b and a concave outlet side 3c.

In this example of the realization, the device 1 includes an axial adjusting mechanism 23, which is connected to the machining unit 4 by means of the displacement axes 9, whereby the lateral displacement of the machining unit 4 is made possible. The lateral displacement on the displacement axis 9 can be facilitated, for example, using linear units.

In addition, the adjusting mechanism 23 in this example of the realization includes a roller 11, coated with an elastomer, which is arranged on the lateral surface of the blade, in this case, the outlet side 3c and which serves to guide the adjusting mechanism 23 or the machining unit 4 attached to the adjusting mechanism 23.

The machining unit 4 can be displaced laterally 7. This lateral direction 7 runs transversely to the direction of the machining 8. In this example of the realization, it also runs at a tangent to the edge 3a. The unidirectional adjusting force 10 can be provided, for example, by a spring or a pneumatic system.

The direction of the machining 8 indicates the direction along which the device 1 is moved. Here, The direction can be defined, for example, by two points (start and end point of the machining), which are connected by an imaginary line (the direction of the machining 8). This imaginary line, particularly for complex blade geometries, is not identical to the line of the edge, which has curves or rounded areas, for example. The device adjusts to these deviations due to the displacement ability of the machining unit, such that the quality of the recontouring is improved.

FIGS. 4 and 5 show the preferred three-point bearing of the device 1. Three-point bearing always includes a side bearing 5a or 5b, each of which is in contact with a lateral surface of the blade 2 via two locating points 22, and a support 6a or 6b, which is supported via a locating point 22 on the edge 3a of the blade. In an alternative example of the realization, further supports can also be provided.

In this example of the realization, a three-point bearing is formed using the supports 6a and the side bearing 5a, whereby the support 6a comprises the guide point AB3 and the side bearing 5a comprises the guide points AB1 and AB2.

The second three-point bearing is formed by the support 6b and the side bearing 5b, whereby the support 6b comprises the guide point AB3' and the side bearing 6a comprises the guide points AB1' and AB2'.

The machining unit 4 is arranged between the three-point bearings.

The compression force F3 braces the pressure forces and the forces resulting from the movement of the device. This is preferably imposed on the opposite side of the blade 2. It is preferably imposed on an area located centrally between the three-point bearings. Alternately, multiple pressure forces, whose resulting compression force is approximately equivalent to F3, can also be worked with.

Preferably, the pressure forces are utilized to realize a feed motion on the blade 2 via driven rollers 11 or belts. Thus, a motorized feed motion is preferred; in another embodiment, however, manually induced feed motions can also be preferred. In FIG. 3, the left roller 11 (on the intake side 3b of the blade 2) is realized as a contact pressure roller; the right roller 11 (on the outlet side 3c of the blade 2) is realized as a guide roller. The guide roller serves to move the machining process, when, for example, there is a dent in the blade 2 between the two supports 6a and 6b. It follows the deviation in the blade 2 and feeds the machining process. The contact pressure roller, which realizes the feed motion, utilizes the contact pressure force F3, at least partially, as a friction connection.

The force F3 is preferably provided via a press-on assembly, not shown, which is preferably pneumatically generated. Alternately, toggle clamps, hydraulics, spindles or linear motors are preferred.

For operating or removing the device 1, the press-on assembly or the force F3 is cut back. In operation, this is adjusted, preferably power controlled, to the varying thicknesses of the components.

If necessary, the adjusting mechanism 23 of the machining unit 4 is preferably capable of compensating for minor deviations and slight damage at the level of the machining.

In FIGS. 6 and 7, the geometric conditions at the margin are illustrated in detail. Each upper part of the figures is a side view; the lower parts are each plan views. The device 1 is guided along the blade 2 via two three-point bearings, each of which is located on a contact level 13, 14.

The overall clearance Z of the contact levels 13, 14 is X+Y. If, for example, a dent within the blade edge should cause a deviation, then this arrives on the machining plane 12 with the clearance X. This deviation is not present if X=0. Very small deviations are obtained if X is minimal and Y is maximum.

In the example of the realization in FIG. 6, a roller 11 allows the machining unit 4 to be guided precisely along the edge 3a, since the machining unit 4 can, in particular, be shifted laterally, where necessary, by this tracking roller, to adjust to deviations in the progress at the edge.

A further embodiment is shown in FIG. 7. Here, the X value has been reduced to zero. Even in this fashion, a maximum axial matching accuracy has been achieved by the device 1.

By reducing the X value to zero, the technical advantage, that even the tangential matching to the flow surface is maximized, continues to be achieved. Here, the two guide points AB1 and AB2, realized as guide rollers, ensure the tangential matching.

The problem arising in the process under certain circumstances, that the positioning location and the machining function are at the same position, can be solved by replacing the support 6a or the guide point AB3 with a pair of rollers (26). The pair of rollers 26 (AB3b and AB3a) comprises two rollers 11, which are connected by a shaft 15 and which are arranged on the machining unit 4 at a pivot point 16.

Thanks to the hinge-mounted shaft, dimensional inaccuracies, roughened areas and variations in height before and after the machining can be centered. An additional roller 11 for tracking (as, for example, in FIG. 6) can be dispensed with.

The machining unit 4 can include a cutting or grinding machining of the edge 3a. Alternately, supplementing the material using build-up welding or reshaping the edge 3a by means of fusion of the edge 3a is also conceivable, e.g. as is disclosed by the applicant in the submitted but not yet published application, DE 10 2010 036 042.2. In terms of the fusion technique, the application DE 10 2010 036 042.2 should be added to the disclosure of this application in its entirety.

By way of example, the preferred fusing of the edge 3a is intended to be explained by reference to FIG. 8.

Figure 8:
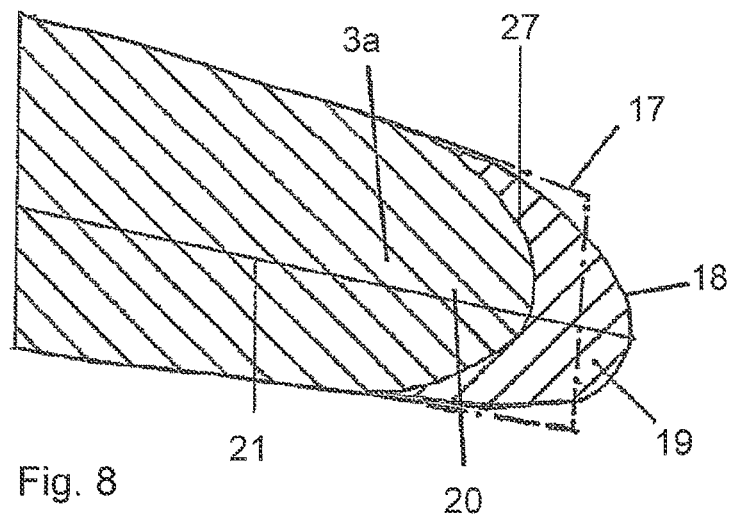
FIG. 8 shows a section view through a leading edge of a gas turbine blade before and after recontouring.

In FIG. 8, the edge 3a is shown enlarged. Here, the condition before repair using the device 1 is identified as erosion contour 17. The erosion contour 17 is, as a rule, approximately planar and features an end face. The condition of the edge 3a after the repair is depicted as new contour 18 or cut contour 27. Using the device, which preferably includes a laser unit to generate a laser beam, a certain volume of the eroded edge 3a is fused in a targeted fashion and solidified into an aerodynamically beneficial shape. This transition from the erosion contour 17 to the new contour 18 is achieved here by a redistribution of the available material. Material is neither removed nor added. The reconsolidated material 19 is the forward section of the edge 3a, which has come from a molten mass, and behind which the region with the unmelted base material 20 is to be found.

By using an appropriately equipped device 1, which includes a laser unit for machining, the chord length of the blade 2 can thus be reconstructed to an extent. In FIG. 8, a chord length section 21 is shown.

Due to improved management of the device 1, the machining unit 4 can be moved to the edge 3a, preferably without contact, which was not possible according to the solution known from the prior art. The clearance of the machining unit 4 is important since the recontouring of the edge 3a e.g. by fusion may also involve a change in the shape of the edge 3a in the direction of the machining unit 4, which should not be interfered with by the placement of the machining unit 4.

Where the machining unit 4 recontours the edge 3a by fusion or build-up welding, one of the second supports 6a or 6b is located on the edge 3a which has not yet been machined, i.e. the edge 3a which is still cold, while the other respective support 6a or 6b Is located on an already recontoured section of the edge 3a. Here, the clearance of the supports 6a and 6b from the machining unit 4 is always selected such that the supports 6a and 6b are not damaged by the heated edge 3a in the contact area and their function as supports is not affected. Likewise, the recontoured edge 3a is not damaged by the supports 6a, 6b.

Where a cutting technique such as grinding, milling or shaving is utilized in the machining unit 4 to round off the edge 3a, the original erosion contour 17 can be formed into an aerodynamically beneficial cut contour 27 while reducing the chord length 21. Here, the cut contour created 27 is better than the erosion contour 17 in terms of its aerodynamic characteristics.

The machining unit 4 can also incorporate a combination of the other machining techniques mentioned above, which are consecutively arranged in the longitudinal direction of the edge 3a, such that the edge 3a, for example, is consecutively machined using various machining techniques. So it is conceivable, for example, to thicken the edge 3a with additional material first by means of build-up welding, and then to produce the target form of the edge 3a by grinding or using a cutting machining technique. During this movement, the edge 3a, whose shape has been changed due to erosion and other wear, is recontoured by the device 1 to an aerodynamically more advantageous shape and, in particular, rounded off.

A preferred guidance for the device 1 can be achieved by the supports 6a and 6b and the side bearings 5a and 5b finding their way into directions at an angle of 90 degrees to one another and to the attachment on the blade. The supports 6a and 6b are supported perpendicularly on the edge 3a; the side bearings at an angle of 90 degrees to this in a lateral direction 7.

Figure 9:
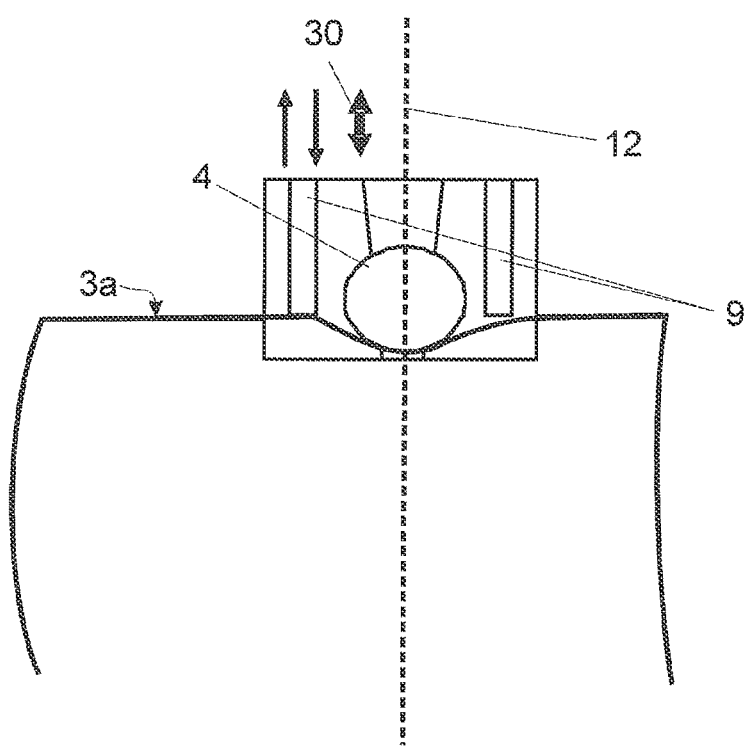
FIG. 9 shows a representation of the pressure controlled auto tracking of the height positioning.

In FIG. 9, a further improvement is depicted. Underlying this is a problem occurring when using the known cutting recontouring techniques For example, with the device described in the publication, U.S. Pat. No. 6,302,625 B1, for indentations in blade edges, the result may be that the machining unit used there may not be able to follow an additional indentation.

According to certain guidelines, these indentations occur, for example, when a notch in the edge of the blade has been caused by a stone or similar. Rounding off utilizes defined radii for the overall rounding off and may only be realized over a certain area of the leading edge. If the machining tool or the machining unit does not now follow the contour exactly, but produces a delayed reaction to the indentation, for example, due to the clearance of the supports installed, then, when the first supports dip into or are lowered into the indentation, the indentation and the original area of the blending are further extended, whereby this may result in exceeding the permissible breach range.

In addition to the unnecessary removal of material when the first support enters, dips or is lowered into the indentation, there is a reduced removal at the deepest point of the indentation due to the support having been provided with a linear course for the leading edge or the trailing edge. Further material is unnecessarily removed on moving out of the indentation since the support following the cutting process is still in the indentation, while the cutter is already passing the trailing edge of the indentation and hence is processing an undefined and, if in doubt, an unnecessary amount of material removal.

A pressure controlled infeed for the machining unit for the machining edge, as shown in FIG. 9, provides a remedy here.

This pressure control defines the pressing force of the machining unit 4. Hence, the machining unit 4 follows the edge 3a, power-controlled. Alternately, sensors can be deployed in order to realize a path control with the same pattern of movement. Preferably, this operates power-controlled with a pneumatic unit. This is, moreover, also used to withdraw the machining unit 4 from the workpiece at the end of the machining, such that, for example, excessive material removal at the completion of the machining, that is when the device is stationary, is prevented. Damaging friction is also prevented from causing the (titanium) base material to overheat when the device is stationary.

Here, the machining unit 4 is preferably adjusted using linear units. The displacement axis 9 made possible as a result is adjusted in the direction towards the edge 3a in the vertical direction 30. Here, the linear units are preferably realized as dovetail guides or pillar guides.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

1 Device
2 Blade
3a Edge
3b Intake side
3c Outlet side
4 Machining unit
5a Side bearing
5b Side bearing
6a Support
6b Support
7 Lateral direction
8 Direction of the machining
9 Displacement axis
10 Adjusting force
11 Roller
12 Machining plane
13 Contact level
14 Contact level
15 Shaft
16 Pivot point
17 Erosion contour
18 New contour
19 Reconsolidated material
20 Base material
21 Chord length section
22 Locating point
23 Adjusting mechanism
24 Contact pressure and/or drive roller
26 Pair of rollers
27 Cut contour
30 Vertical direction

The invention claimed is:
1. A device for recontouring a gas turbine blade, the device comprising:
at least one support configured to rest on an edge of the gas turbine blade during the recontouring;

at least one side bearing configured to rest on at least one of an intake side or outlet side of the gas turbine blade during the recontouring;

a machining unit for machining the gas turbine blade, the machining unit being configured to fuse at least one partial area of the edge of the gas turbine blade using a beam of energy that is targeted such that material of the blade solidifies into a new contour, substantially without the addition of supplementary material.

2. The device according to claim 1, wherein the at least one support includes at least two supports and the at least one side bearing includes at least two side bearings.

3. The device according to claim 2, wherein the machining unit is disposed between the two of the supports.

4. The device according to claim 1, wherein each of the side bearings include at least two locating points or faces.

5. The device according to claim 4, wherein each support includes a locating point or face, and wherein the locating points or faces of a first of the side bearings is disposed on a contact level with the locating point or face of a first of the supports.

6. The device according to claim 5, wherein the locating points or faces of a second of the side bearings are disposed on a contact level with a locating point or face of a second support.

7. The device according to claim 1, wherein at least one of the supports or side bearings include a hinge-mounted roller.

8. The device according to claim 1, where a press-on assembly is disposed on at least one of the intake side or outlet side of the gas turbine blade facing the side bearings.

9. The device according to claim 8, wherein the press-on assembly includes at least one of pneumatic, hydraulic or spring elements.

10. The device according to claim 8, wherein the press-on assembly includes hinge-mounted rollers.

11. The device according to claim 7, wherein the hinge-mounted roller is drivable by a driving device.

12. The device according to claim 11, wherein the driving device and the machining unit are controlled as coupled.

13. The device according to claim 1, wherein the machining unit includes a laser unit.

14. The device according to claim 1, wherein each support includes two rollers, which are connected to one another by a hinge-mounted shaft, and wherein the device is configured such that machining takes place between the two rollers.

* * * * *